United States Patent
French et al.

(10) Patent No.: US 10,618,232 B2
(45) Date of Patent: Apr. 14, 2020

(54) FUNCTIONAL FILM LAMINATE (71) Applicant: Essilor International, Charenton-le-Pont (FR)

(72) Inventors: Elliot French, Dallas, TX (US); Severine Tisne, Dudley, MA (US); Paresh Kitchloo, Dudley, MA (US)

(73) Assignee: Essilor International, Charenton-le-Pont (FR)

( * ) Notice: Subject to any disclaimer, the term of this patent is extended or adjusted under 35 U.S.C. 154(b) by 265 days.

(21) Appl. No.: 15/744,316

(22) PCT Filed: Jul. 15, 2015

(86) PCT No.: PCT/IB2015/001759
§ 371 (c)(1),
(2) Date: Jan. 12, 2018

(87) PCT Pub. No.: WO2017/009680
PCT Pub. Date: Jan. 19, 2017

(65) Prior Publication Data
US 2018/0200973 A1    Jul. 19, 2018

(51) Int. Cl.
*G02B 1/04* (2006.01)
*B29D 11/00* (2006.01)
*G02B 1/10* (2015.01)
*G02B 1/14* (2015.01)
*B29K 629/00* (2006.01)
*B29K 669/00* (2006.01)

(52) U.S. Cl.
CPC .... *B29D 11/00009* (2013.01); *B29D 11/0073* (2013.01); *B29D 11/00932* (2013.01); *G02B 1/04* (2013.01); *G02B 1/041* (2013.01); *G02B 1/043* (2013.01); *G02B 1/10* (2013.01); *B29K 2629/04* (2013.01); *B29K 2669/00* (2013.01); *G02B 1/14* (2015.01)

(58) Field of Classification Search
CPC ............ B29K 2629/04; B29K 2669/00; G02B 1/041; G02B 1/043; G02B 1/14
See application file for complete search history.

(56) References Cited

U.S. PATENT DOCUMENTS

| 6,855,396 B1 * | 2/2005 | Mennig ................. B05D 7/546 427/314 |
| 2005/0168690 A1 | 8/2005 | Kawai et al. |
| 2007/0024973 A1 * | 2/2007 | Baiocchi ............ B29D 11/0073 359/487.02 |

(Continued)

FOREIGN PATENT DOCUMENTS

| EP | 1 560 060 A1 | 8/2005 |
| WO | 2014/105048 A1 | 7/2014 |

OTHER PUBLICATIONS

International Search Report and Written Opinion dated Feb. 5, 2016 in PCT/IB2015/001759 filed Jul. 15, 2015.

*Primary Examiner* — Scott W Dodds
(74) *Attorney, Agent, or Firm* — Oblon, McClelland, Maier & Neustadt, L.L.P.

(57) ABSTRACT

This invention relates to the development of a multi-layer PC polar laminate and its cut and form process. The laminate displays increased adhesion between a PC film layer and an adjacent film layer. As a result of the increased adhesion, less adhesive may be applied between laminate layers, which positively affects PC cracking and mold cavity contamination.

21 Claims, 3 Drawing Sheets

(56) References Cited

U.S. PATENT DOCUMENTS

| | | | |
|---|---|---|---|
| 2010/0182548 A1* | 7/2010 | Suzuki | C08J 5/18 |
| | | | 349/96 |
| 2013/0278892 A1 | 10/2013 | Jiang et al. | |
| 2014/0037964 A1* | 2/2014 | Zheng | G02B 1/04 |
| | | | 428/412 |
| 2015/0331259 A1 | 11/2015 | Jiang et al. | |

* cited by examiner

| %Boron in PVOH | Storage at 10%rH | Storage at 60%rH |
|---|---|---|
| 2.5% | | |
| 1.5% | | |

Figure 2B

| %Boron in PVOH | No Pre-Heat | Pre-Heat = 140 °C/5min |
|---|---|---|
| 2.5% |  |  |
| 1.5% |  |  |

Figure 3

| %Boron in PVOH | No Pre-Heat | Pre-Heat = 140 °C/5min |
|---|---|---|
| 2.5% |  |  |
| 1.5% |  |  |

Figure 4

FUNCTIONAL FILM LAMINATE

FIELD OF THE INVENTION

This invention relates to a method for improved polycarbonate (PC) adhesion within a thermo-formable multilayered laminate using an environmentally safe and robust adhesive. In addition, film properties and thermoforming conditions are defined to satisfy strict optical property requirements for the ophthalmic lens market.

BACKGROUND

Acrylic and polyurethane-based adhesives are commonly used for adhering PC films to adjacent layers in the ophthalmic lens industry. Although these adhesives have been used for decades, they present manufacturing complexities, as well as health and environmental concerns.

Many acrylic and polyurethane-based adhesives require an organic solvent for proper application. The use of organic solvents for adhesive application presents a variety of health and environmental concerns. Most organic solvents are flammable and must be disposed of under costly, highly-regulated conditions. Many organic solvents are volatile, irritate nasal and esophogeal membranes, and are capable of causing permanent tissue damage. One example of a toxic organic solvent is hexane, which is oxidized by the body to hexane-2,5-dione, a compound which is damaging to nerve cells.

Polyurethane adhesive layers are applied as relatively thick layers, ranging from a minimum thickness of 10 μm to thicknesses as high as 60 μm, depending on the manufacturer. During production processes such as molding, laminates are subjected to high pressures and temperatures. For relatively thick adhesive layers, applied pressure on a laminate layers causes adhesive to be ejected out from between laminate layers. The ejected adhesive contaminates the mold cavity and requires frequent cleaning. An adhesive that can be applied in a relatively thin layer would resist pressure-induced ejection and prevent mold cavity contamination.

In order to address shortcomings associated with acrylic and polyurethane-based adhesives, alternative adhesive strategies have been investigated. U.S. Patent Publication No. 2013/0004775 discloses photochromic laminates using a polyurethane adhesive crosslinked with an isocyanate-active prepolymer via a crosslinking agent. Japanese Patent Application JP2011085900 discloses a PC polarized laminate with particular polyvinyl alcohol (PVOH, also referred to as PVA) film mechanical properties. U.S. Pat. No. 7,198,830 discloses a polycarbonate resin composition comprising a mixture of two polycarbonate resins. U.S. Pat. No. 7,118,806 discloses a plastic molded article comprising a multi-layer laminate adhered to a polycarbonate base material with a urethane adhesive. During lens production, adhesive application and the subsequent thermoforming process must provide a wafer capable of producing a PC polar lens with excellent cosmetics, optics, color, edging results, and crazing results. The laminate must be compatible with currently employed PC polar processes, i.e., thermoforming, injection molding, surfacing, HMC, edging, and mounting. An existing technical challenge is to provide an optical adhesive to bond PC films to adjacent laminate layers that is safe and compatible with current processes.

There is a need in the industry for an improved method for adhering PC layers to adjacent layers in an ophthalmic lens stack which is environmentally-friendly, resistant to processing degradation, and adaptable to current production methods.

SUMMARY

Hence, an aim of the present invention is to provide a method for producing an ophthalmic lens comprising a laminate with at least one polycarbonate layer adhered to at least one polyvinyl alcohol (PVOH) layer, comprising
  treating a polycarbonate (PC) film with an aminosilane primer in a concentration range of from 0.5 to 15%, preferably between 4 and 6%;
  applying a PVOH-based resin adhesive to a PVOH film;
  laminating the treated PC film to the PVOH film to produce a laminate;
  heat curing the laminate; and
  cutting the laminate into a laminate wafer;
wherein the laminate may further comprise one or more additional layers or sublayers, each layer or sublayer being independently selected from PC, PVOH, polymethyl methacrylate, cellulose triacetate, cellulose acetate butyrate, cellulose acetate, cyclic olefin copolymer, norbornene-containing olefin polymer, polyurethane, polystyrene, polyethylene terephthalate, or other clear or colored film layers.

Thus, the present invention is to provide a method for producing an ophthalmic lens comprising a laminate with at least one polycarbonate (PC) film layer adhered to at least one polyvinyl alcohol (PVOH) film layer, for example, having varying degrees of polymerization, i.e., 1700, 2400, etc.

In some embodiments, the PVOH film may comprise a boron content less than 5%, preferably less than 2%. Boron can be acquired from a variety of sources, including but not limited to borate salts, such as sodium borate and calcium borate, boric acid, borate esters, such as triethyl borate and tri-tert-butyl borate, boric oxides, such as boric anhydride and boron trioxide, boric acid precursors, such as decaborane, organo-boron complexes, such as lithium tetra(2-methyl-8-hydroxyquinolinato)boron, amorphous boron nitride, crystalline boron nitrides, such as hexagonal α-BN, amino borane complexes, such as borane trimethylamine complex and borane morpholine complex, aromatic borates, such as sodium tetra(p-tolyl)borate and sodium tetrakis(4-fluorophenyl)borate dihydratein some aspects, decreased boron content correlates with decreased PVOH crazing. In some embodiments, the PVOH film is a polarized PVOH film. In some aspects, the method may comprise pre-treating a PC film with an aminosilane primer prior to adhesion to the PVOH film. A particular aminosilane primer is 3-aminopropyl-triethoxysilane. The aminosilane primer may be provided in aqueous solution in a concentration range of from 0.5 to 15%, preferably between 4 and 6%. The PC pre-treatment conditions may comprise treating the PC film with an aqueous aminosilane primer solution at elevated temperature. In some embodiments, the PC film is pre-treated with aminosilane primer at a temperature ranging from 20 to 100° C., preferably at a temperature ranging from 50 to 60° C. In some embodiments, the aminosilane primer solution is rinsed after PC film pre-treatment. The aminosilane primer rinsing may be performed with de-ionized water, distilled water, softened water, and/or water that has been processed by reverse osmosis, carbon filtration, microporous basic filtration, and/or UV radiation. Aminosilane primer rinsing may be performed at a temperature ranging from ambient temperature to 60° C., preferably between 50 and 60° C.

In some aspects, the PVOH film is treated with a PVOH-based resin adhesive prior to lamination or at the lamination nip. The PC film may be a stretched or an unstretched PC film. The PVOH-based resin adhesive may comprise a solution of a PVOH resin in water and may further comprise HCl. In some embodiments, the PVOH resin solution may comprise 0.5% HCl, preferably 0.1% HCl. In a particular embodiment, the PVOH-based resin adhesive is an acetoacetyl-modified PVOH-based resin, where the acetoacetyl modification provides for increased reactivity over standard non-modified PVOH resins. The PVOH-based resin adhesive may be applied in a layer thickness of less than 10 μm.

In a particular embodiment, the post-curing PVOH-based resin adhesive layer thickness is less than 10 μm, preferably less than 5 μm.

The PVOH-based resin adhesive may further comprise an additive that improves adhesion, and increases water resistance of the bonded interfacial layers. In some embodiments, the additive is a crosslinker, and may be selected from the group consisting of an amine, acrylate, isocyanate, melamine, aldehyde, or a metal. In a particular embodiment, the crosslinker is glyoxal.

In some aspects, a PC film is pre-treated with aminosilane primer, the primer is rinsed, a PVOH film is treated with a PVOH-based resin adhesive, and the PC film is laminated to the PVOH film to produce a laminate. Lamination is the technique of manufacturing a material in multiple layers or applying one or more successive layers to a substrate. In some embodiments, a successive layer is coupled to a substrate by heat, pressure, and/or adhesive.

An exemplary lamination technique is a 3-ply wet lamination method. 3-ply wet lamination is a preferred method by which a coating is dispensed between laminate film layers. A film layer coating, for example, an adhesive, is dispensed on the receiving side of the lamination nip rollers. The lamination nip rollers bring all laminate layers into contact with sufficient speed, tension and pressure as to produce a multilayered laminate with evenly distributed adhering layers. From the lamination nip, the laminate is passed through an oven to dry the adhesive and adequately bond the laminate layers for passage to subsequent winding equipment.

Coating a PVOH-based adhesive solution onto surfaces of a PVOH film and/or outer PC films prior to the lamination nip is an alternative adhesive application method that provides consistent adhesive thicknesses. Suitable coating means common in the industry include, but are not limited to, a comma coater, slot die coater, gravure coater, reverse roll coater, knife over roll coater, meyer rod coater, dip coater, spray coater, and air knife coater.

In a further embodiment, the laminate is heat-cured. Heat-curing may comprise heating the laminate to a temperature of at least 60° C., preferably at least 90° C. In some aspects, heat-curing comprises passing the tri-layer laminate through a multipass oven at a temperature of at least 60° C., preferably at least 90° C. for at least 5 minutes. In some embodiments, a heated roller or series of heated rollers are placed after the lamination nip and are used in place of, or in series with, an oven to provide an adhesive curing mechanism by which the laminate layers are heat sealed to further increase adhesion. The laminate may further comprise one or more additional layers or sublayers, each layer or sublayer being independently selected from the group consisting of PC, PVOH, polymethyl methacrylate, cellulose triacetate, cellulose acetate butyrate, cellulose acetate, cyclic olefin copolymer, norbornene-containing olefin polymer, polyurethane, polystyrene, and polyethylene terephthalate or other clear or colored film layers.

The laminate may be further processed prior to incorporation into an ophthalmic lens. Further processing may comprise cutting the laminate into flat sections. Some embodiments comprise cutting the laminate into laminate wafers. The laminate wafers may be substantially circularly shaped. In some embodiments, the laminate wafers are maintained above a minimum relative humidity. The relative humidity level is especially important when a laminate layer comprises higher boron content. Higher relative humidity levels are needed to avoid cracking of layers that comprise higher boron content. For example, a laminate comprising a layer with 1.5% boron displayed no cracks at all relative humidity levels examined. A laminate comprising a layer with 2.5% boron displayed cracks at 35% relative humidity, and no cracks at 60% relative humidity. Maintaining the laminate wafers above a critical relative humidity inhibits or prevents crazing of the PVOH layer. The laminate wafers may be dried to an appropriate moisture content. In some embodiments, appropriate moisture content is 500 ppm or less. In some embodiments, drying to an appropriate moisture content may comprise drying the wafers at a temperature of at least 60° C., preferably at least 80° C. In some aspects, the wafer-drying step is performed for at least 8 hours, preferably at least 12 hours. In some embodiments, the drying step is carried out for 8 to 12 hours to meet the color consistency requirements of the product being made.

In some embodiments, the laminate wafers are thermoformed. Thermoforming comprises subjecting the laminate wafers to heat and pressure that increases the adhesive force of an adhered aminosilane-treated PC layer. The laminate wafers may be pre-heated prior to thermoforming. The pre-heating conditions comprise heating the laminate wafers to a temperature of at least 120° C., preferably at least 140° C. for at least 30 seconds to 8 minutes in order to reach the softening point of the material. In some embodiments, the pre-heating conditions comprise heating the laminate wafers to the glass transition temperature to attain pliability and prevent PVOH film cracking. In some embodiments, the pre-heating conditions prevent PVOH layer microcracking. The thermoforming step may be performed in a commercial thermoforming apparatus, such as a LEMA CPL32 automatic bending machine, for example. In some embodiments, a thermoformed laminate wafer may be incorporated into an ophthalmic lens by a lens-production method, such as injection molding, casting, or lamination. Lamination is the technique of manufacturing a material in multiple layers or applying one or more successive layers to a substrate. An exemplary lamination technique is a 3-ply wet lamination method. In some embodiments, a successive layer is coupled to a substrate by heat, pressure, and/or adhesive. In particular embodiments, a convex side of a lens may comprise a laminate as disclosed herein.

Some aspects of the invention comprise the step of pre-treating a PC film with an aminosilane primer prior to adhesion to the PVOH film layer. The aminosilane primer may be selected from the group consisting of 3-aminopropyl-triethoxysilane, 3-aminopropyl-trimethoxysilane, 3-aminopropyldimethylethoxysilane, 3-aminopropyl-methyldiethoxysilane, 3-aminoethyl-triethoxysilane, bis(3-triethoxysilyl-propyl) amine, bis(3-trimethoxysilyl-propyl) amine, N-(n-butyl)-3-aminopropyl-trimethoxysilane, N-(n-butyl)-3-aminopropyl-methyldimethoxysilane, N-(2-aminoethyl)-3-aminopropyl-trimethoxysilane, N-(2-aminoethyl)-3-aminopropyl-methyldimethoxysilane, 2-aminoethyl-3-aminopropyl-methyldimethoxysilane, 2-aminoethyl-3- aminopropyl-trimethoxysilane, (3-trimethoxysilylpropyl) diethylenetriamine, N,N-di(2-aminoethyl)-3-aminopropyl-trimethoxysilane, N,N-di(2-aminoethyl)-3 aminopropyl-triethoxysilane, N,N-di(2-aminoethyl)-3-aminopropyl-methyldimethoxysilane, N,N-di(2-aminoethyl)-3 aminopropyl-methyldiethoxysilane, N—[N'-(2-aminoethyl)-2-aminoethyl)]-3-aminopropyl-trimethoxysilane, N-methyl-3-aminopropyl-trimethoxysilane, N-methyl-3-aminopropyl-methyldimethoxysilane, N-methyl-3-aminopropyl-triethoxysilane, N-methyl-3-aminopropyl-methyldiethoxysilane, N-cyclohexyl-3-aminopropyl-trimethoxysilane, N-cyclohexyl-3-aminopropyl-triethoxysilane, N-phenyl-3-aminopropyl-trimethoxysilane, and combinations thereof.

In a particular embodiment, a method for producing an ophthalmic lens comprising a tri-layer (PC) wafer is provided. The method may comprise treating a PC film with an aminosilane primer, applying a PVOH-based resin adhesive to a PVOH film, laminating a treated PC film to either side of the PVOH film to produce a tri-layer laminate, and cutting the tri-layer laminate into a tri-layer PC wafer. The lamination method employed may be a 3-ply wet lamination method.

The ophthalmic lenses according to the invention may further comprise a hard coat layer on the side of the thermoplastic substrate opposite to the laminate and/or on the side of the laminate which is not in contact with the thermoplastic substrate. This hard coat may be deposited by any method well known in the art, such as dip coating, spray coating, spin coating, etc. Abrasion-resistant coatings usable in the present invention are already described in the prior art. For example, U.S. Pat. Nos. 4,211,823, 5,619,288, EP 1 301 560 or EP 0 614 957 describe abrasion-resistant monolayer coating compositions containing hydrolyzed silanes and aluminum compounds, and coated articles resistant to abrasion and impacts. The abrasion-resistant monolayer may be selected from polymerizable UV coating like polymerizable (meth)acrylic or epoxy(meth)acrylic monomers or sol-gel coating comprising as the main constituents an epoxyalkoxysilane such as, for example, ☐-glycidoxypropyltrimethoxysilane (GLYMO) and optionally a dialkyldialkoxysilane such as, for example, dimethyldiethoxysilane (DMDES), colloidal silica and a catalyst amount of a curing catalyst such as aluminum acetylacetonate or a hydrolysate thereof, the remaining of the composition being essentially comprised of solvents typically used for formulating these compositions. U.S. Pat. Nos. 5,316,791, 6,503,631 and 6,489,028 describe a combined bi-layer impact-resistant and anti-abrasion system, comprising respectively a primer coating of cured polyurethane or poly(meth)acrylic latex or latex containing butadiene units to which an abrasion-resistant coating is applied. Suitable latex layer used in the present invention is an aqueous dispersion of polyurethane such as commercially available aqueous polyurethane dispersions W-240 and W-234 (supplied by Baxenden Chemicals). According to a preferred embodiment of the invention the abrasion-resistant bi-layer coating comprises a first layer which is the preferred primer latex layer described hereinbefore, and preferably an aqueous dispersion of polyurethane, and a second layer which is the preferred abrasion-resistant monolayer described hereinbefore.

Some aspects of the invention are directed towards a method for increasing the adhesion between a PC film and a PVOH film of an optical article. The method may comprise pre-treating a PC film with an aminosilane primer prior to adhesion to the PVOH film. The PC film may be treated with an aminosilane primer in a concentration range of from 0.5 to 15%, preferably between 4 and 6%. The method may further comprise applying a layer of a PVOH-based resin adhesive to the PVOH film. In some embodiments, the PVOH film may comprise a boron content lower than 5%, preferably less than 2%. The PVOH-based resin may comprise an additive that may improve adhesion, water resistance, and/or thermal-mechanical properties. In some embodiments, the additive is a crosslinker, and may be selected from the group consisting of an amine, acrylate, isocyanate, melamine, aldehyde, or a metal. In a particular embodiment, the crosslinker is glyoxal. The method may further comprise adhering the primer-treated PC film to the PVOH film to produce a laminate. The laminate may further comprise one or more additional layers or sublayers, each layer or sublayer being independently selected from PC, PVOH, polymethyl methacrylate, cellulose triacetate, cellulose acetate butyrate, cellulose acetate, cyclic olefin copolymer, norbornene-containing olefin polymer, polyurethane, polystyrene, polyethylene terephthalate, and other clear or colored laminate film layers known to those of skill in the art.

In some embodiments, a method for increasing the adhesion between a PC film and a PVOH film may comprise the further step of heat-curing the laminate. In particular embodiments, the post-curing PVOH-based resin adhesive layer thickness is less than 10 µm, preferably less than 5 µm. The laminate may be cut into circular or semi-circular laminate wafers. In some embodiments, the laminate or laminate wafers are maintained in storage conditions above a minimum relative humidity level. Maintaining the laminate or laminate wafers above a critical relative humidity inhibits or prevents crazing of the PVOH layer. This is especially true for laminates employing higher boron content and older laminates. In some embodiments, the minimum relative humidity level at which the laminate wafers are maintained is contingent on laminate age and/or boric acid content.

In some embodiments, a method for increasing the adhesion between a PC film and a PVOH film may comprise pre-treating a PC film with an aminosilane primer prior to adhesion to the PVOH film. The aminosilane primer may be selected from the group consisting of 3-aminopropyl-triethoxysilane, 3-aminopropyl-trimethoxysilane, 3-aminopropyl-dimethylethoxysilane, 3-aminopropyl-methyldiethoxysilane, 3-aminoethyl-triethoxysilane, bis(3-triethoxysilyl-propyl) amine, bis(3-trimethoxysilyl-propyl) amine, N-(n-butyl)-3-aminopropyl-trimethoxysilane, N-(n-butyl)-3-aminopropyl-methyldimethoxysilane, N-(2-aminoethyl)-3-aminopropyl-trimethoxysilane, N-(2-aminoethyl)-3-aminopropyl-methyldimethoxysilane, 2-aminoethyl-3-aminopropyl-methyldimethoxysilane, 2-aminoethyl-3-aminopropyl-trimethoxysilane, (3-trimethoxysilylpropyl) diethylenetriamine, N,N-di(2-aminoethyl)-3-aminopropyl-trimethoxysilane, N,N-di(2-aminoethyl)-3 aminopropyl-triethoxysilane, N,N-di(2-aminoethyl)-3-aminopropyl-methyldimethoxysilane, N,N-di(2-aminoethyl)-3 aminopropyl-methyldiethoxysilane, N—[N'-(2-aminoethyl)-2-aminoethyl)]-3-aminopropyl-trimethoxysilane, N-methyl-3-aminopropyl-trimethoxysilane, N-methyl-3-aminopropyl-methyldimethoxysilane, N-methyl-3-aminopropyl-triethoxysilane, N-methyl-3-aminopropyl-methyldiethoxysilane, N-cyclohexyl-3-aminopropyl-trimethoxysilane, N-cyclohexyl-3-aminopropyl-triethoxysilane, and N-phenyl-3-aminopropyl-trimethoxysilane.

A structure or composition that is configured in a certain way is configured in at least that way, but may also be configured in ways that are not listed. Metric units may be derived from the English units provided by applying a conversion and rounding to the nearest millimeter. The feature or features of one embodiment may be applied to other embodiments, even though not described or illustrated, unless expressly prohibited by this disclosure or the nature of the embodiments.

Any embodiment of any of the disclosed compositions and/or methods can consist of or consist essentially of— rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

BRIEF DESCRIPTION OF THE FIGURES

FIG. 1 is a depiction of one embodiment of the invention. The exemplary tri-layer laminate comprises a PVOH film laminated between PC films. A PVOH-based adhesive adheres the PVOH film to the PC films. The tri-layer laminate includes protective film layers on the exterior surfaces.

FIG. 2A includes 100× microscopy images of PVOH layers that compares crazing for films of different boron content after a drying step at 82° C. At low relative humidity (10%), the high boron content film displays crazing. At higher relative humidity, neither of the films display crazing, suggesting that high relative humidity can overcome the crazing tendency of a high boron content film. FIG. 2B includes 100× microscopy images of PVOH layers that compares crazing for thermoformed films after pre-heating and no pre-heating. Base=8.0, Storage=28° C. at 60% relative humidity. The no pre-heat, high boron content film displays the highest level of crazing. Preheating the high boron film decreased the level of crazing. Under no pre-heating conditions, the low boron content film displays significantly less crazing than the high boron film. Crazing is not visible in the low boron, pre-heated film. This demonstrates that both low boron content and pre-heating prior to thermoforming reduce or prevent crazing.

DETAILED DESCRIPTION

Figure 1:
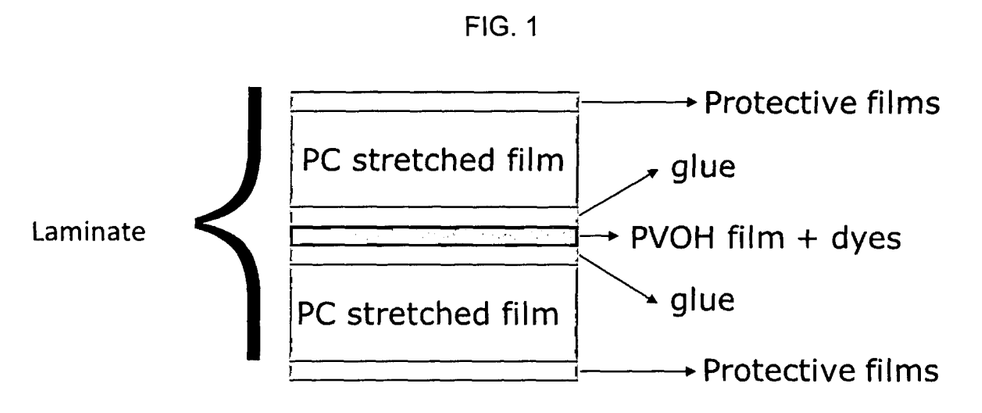
Figure 2A:
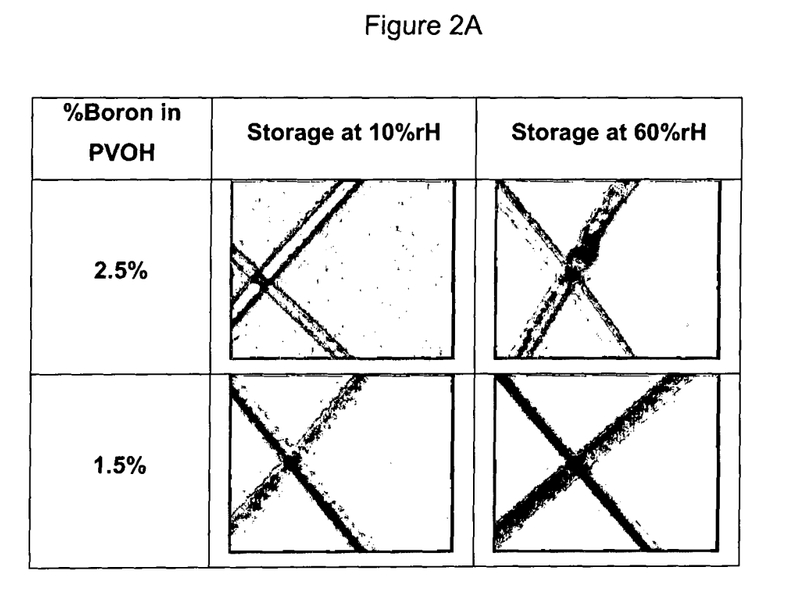
FIGS. 2A and 2B illustrate PVOH crazing for different conditions.
Figure 2B:
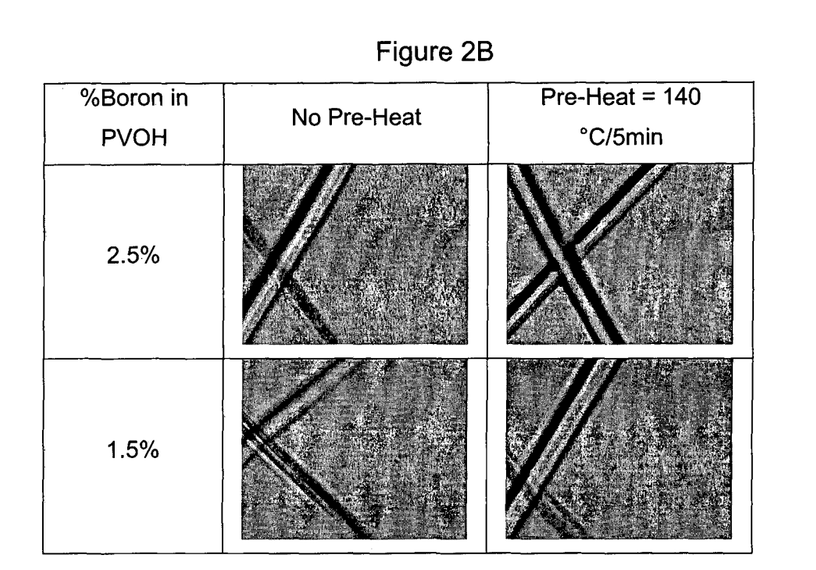
Figure 3:
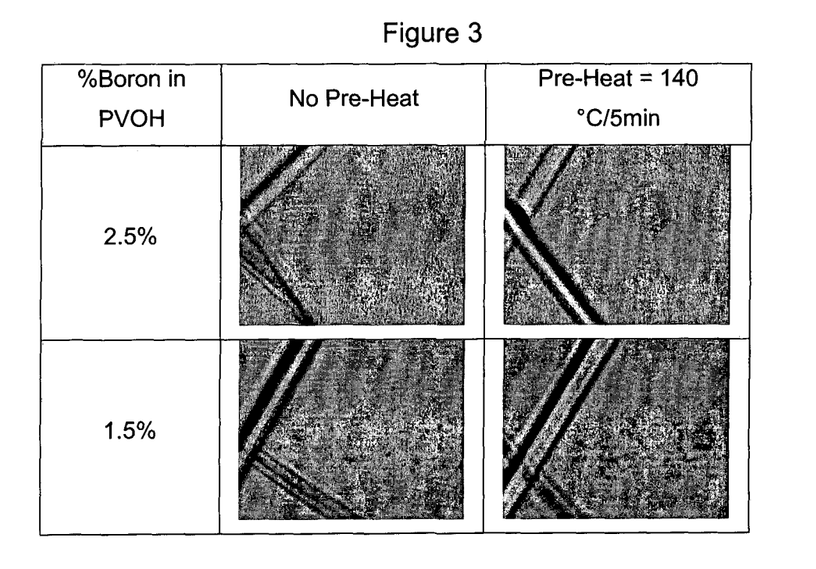
FIG. 3 includes 100× microscopy images of PVOH layers that compares crazing for thermoformed films after pre-heating and no pre-heating. The conditions model indoor, room-temperature conditions, with storage temperature and relative humidity that are lower than the conditions of FIG. 2B (22° C. vs 28° C. and Rh 10% vs 60%, respectively). The respective films (boron content and preheat) display higher crazing levels than the films in 2B, demonstrating that high relative humidity and high storage temperature reduce crazing. Additionally, the crazing trend mirrors the trend in FIG. 2B which demonstrates that both low boron content and pre-heating prior to thermoforming reduce or prevent crazing.
Figure 4:
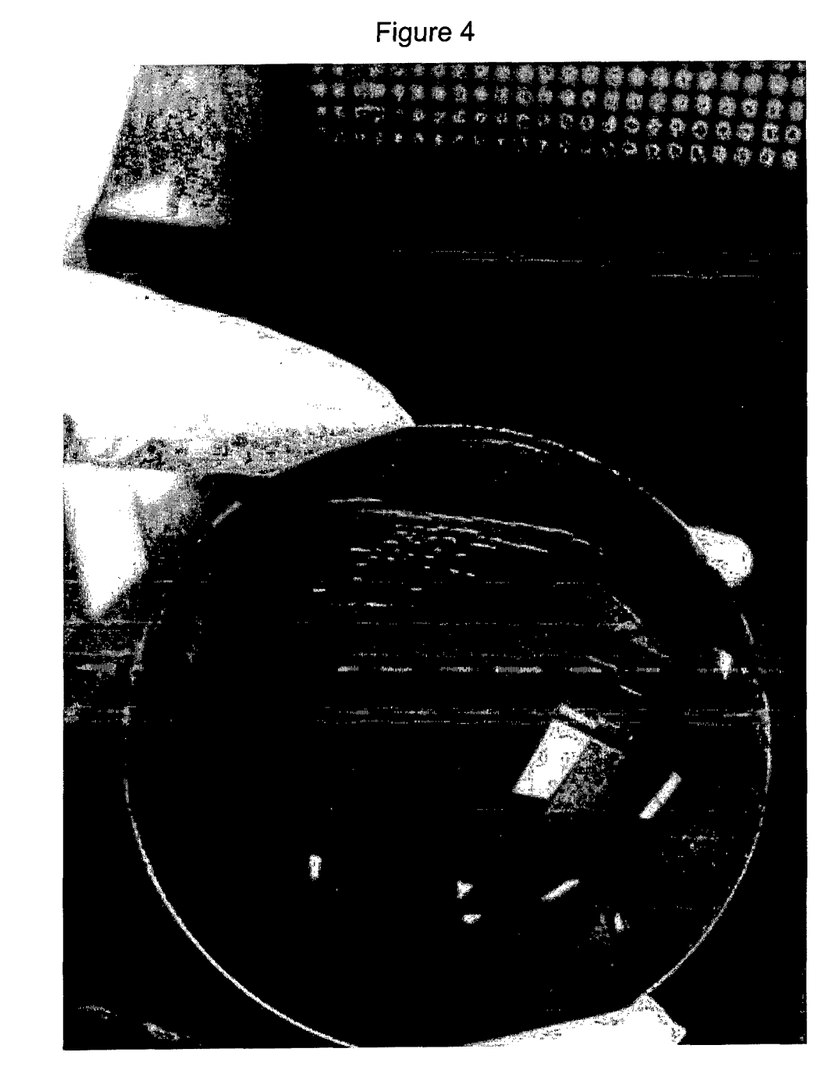
FIG. 4 illustrates an example of PC cracks after the hard coating process.

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Disclosed herein is a method for increasing adhesion of PVOH films to adjacent films in a laminate. As a result of the increased adhesion, less adhesive may be applied between laminate layers, which positively affects PC cracking and mold cavity contamination. While investigating the laminate cut and form processes, factors that affect PVOH crazing were identified.

A. PC Film Adhesion

It is known that PVOH-based adhesives adhere to PVOH films. PVOH-based adhesives, however, do not adhere very well to PC films. It was found that treating the PC layers with an aqueous solution of an aminosilane primer promotes adhesion of the PVOH-based adhesive to the PC film. It was also found that the primer-treated PC displayed significantly improved adhesion to PVOH films after thermoforming and molding of the lens.

B. PVOH Crazing During the Wafer Forming Step

During ophthalmic lens production, laminate sheets are cut into wafers for incorporation into a lens. During the wafer-forming step, PVOH layers often develop networks of fine, cracks, which is known as crazing. It was found that PVOH crazing could be controlled by (a) optimizing the boric acid level in the stretched PVOH layer; (b) incorporate a pre-heating step during thermoforming, and/or (c) control the storage humidity above a critical humidity level.

C. PC Cracking after Hard Coating

During the ophthalmic lens thermoforming and lens production, e.g., injection molding, casting, or UV lamination, excessive stress is placed on the front PC layer which can lead to the formation of cracks. During the hard coating process, lenses are heated, blasted with utrasonic waves, and subjected to aggressive caustic treatment. PC films are not compatible with hydroxide solutions, and the harsh hard conditions can cause propagation of cracks in the PC layer. The PC crack issue has presented a problem for established lens production processes. It is believed that the PC cracking is caused by internal stresses that are created at the interface of the PC stretched film and the glue/other layer during the wafer forming process and lens molding process. Testing has indicated that the layers adjacent to a PC layer can have a significant impact on PC cracks because adjacent layers can induce extra stress on the neighboring PC layer during processing. The PVOH-based adhesive of the present invention has a minimal impact on transmitting stress to PC layers, in part due to the low requisite adhesive layer thickness. Some laminates incorporate layers adjacent to the PC layer which are greater than or equal to 80 μm. Such a layer may have inadequate thermal mechanical properties which is exacerbated by the excessive thickness to have an impact on stress transmitted to the neighboring PC layer. In some embodiments, the PVOH-based adhesive layer is less than 5 μm thick and thermo-mechanically suitable, thereby minimizing stress on the adjacent PC layer. It was found that laminates disclosed herein with PVOH-based adhesive and aminosilane primer presented no PC cracking when processed through hard coating.

D. Insert Contamination

The PVOH-based adhesive and primer thickness is on the order of a few microns. The post-curing PVOH-based resin adhesive layer thickness is less than 10 µm, preferably less than 5 µm. This adhesive layer thickness is significantly less than other known solutions, including polyurethane and UV acrylic adhesives. The minimized adhesive layer thickness presents an advantage during injection molding where the adhesive could be squeezed out of the polarizing structure due to the high pressures involved in the process. The ejected adhesive accumulates at the edges of mold cavities, and may be incorporated into and cause defects in subsequently-produced lenses. The ejected adhesive accumulation, or insert contamination, is identified as white speck/gummy speck and requires extensive and repetitive cleaning of the mold. This ejected adhesive contamination problem may be ameliorated by the inventive PVOH-based resin adhesive, which may be applied in relatively thin layers.

E. Edging:

Edging is an additional criteria for qualitatively evaluating the adhesive properties on the lens. For this method, lenses are subjected to an edging test using edgers thought to be more aggressive in the cutting action to obtain the shape of a standard frame. The edged lenses are carefully inspected for delaminations after edging that could occur between the PC and PVOH films. After submission of 20 lenses each for base 1.50 to a power of −4 and 8.50 to a power of +4, it was found that none of the lenses had delamination after being edged to the shape of frame mount.

F. Exemplary Laminate Production Steps

1: Treat a PC film with a primer solution of 3-aminopropyl-triethoxysilane diluted to 5% in water. The primer solution may be be at a temperature ranging from ambient temperature to 80° C., preferably between 50 and 60° C. Rinse the treated PC film at 60° C. for 90 seconds in heated DI water. The film is then dried using a drying step.

2: Laminate two treated PC films to either side of a PVOH film using a PVOH-based adhesive to give a tri-layer laminate. Adhesive=5% Z-320; 5% Glyoxal; 0.1% HCl and the remainder water. Z320 is an acetoacetyl modified PVOH resin. Glyoxal is the two-carbon dialdehyde, ethanedial.

3: Heat cure the adhesive by passing the tri-layer laminate through a multipass oven at a temperature of at least 90° C. for 5 minutes and wind to a roll.

4: Cut laminate into flat sections for transport.

G. Exemplary Thermoforming Steps

1: Die-cut laminate to appropriate circular shape.

2: Maintain storage conditions for die-cuts above a critical relative humidity. This reduces/prevents PVOH crazing, especially for laminate using high boric acid PVOH film and/or older laminate.

3: Immediately prior to thermoforming, dry the circles to an appropriate moisture content to preserve color and polarization efficiency. Drying conditions include heating to 82° C. for 12 hrs.

4: Pre-heat the circles at 140° C. for 5 minutes.

5: Immediately load the wafers from pre-heat to a thermoforming device which performs the thermoforming operation to produce a wafer of desired base. Thermoforming conditions are set at 152° C. for 2 to 10 minutes.

H. Adhesion

The PC-aminosilane treatment is important for enhanced PC to PVOH adhesion. The PVOH-based adhesive layer is approximately 1 µm thick. Application of heat and pressure, by thermoforming, for example, to a laminate comprising an aminosilane-treated PC layer increases adhesion as the heat and pressure reinforce the interfacial and cohesive strength of the glue. The pressure and heat during molding is approximately 1200 psi and 130° C. The inventive method comprising PC-aminosilane treatment, a PVOH-based adhesive, and subsequently-applied heat and pressure provides exceptional adhesion for such a thin layer of adhesive. The adhesion from laminate to lens increased from approximately 12 N/in to over 60 N/in (Table 1).

Adhesion was measured using a tensile testing device from Instron to measure the force as the PC to PVOH interface is peeled apart at a set speed in the laminate's machine direction. The test was arranged so that the peel was 180 degrees on the laminate and 90 degrees on the lens. The results produced are given as Newtons per extension length. This force is then converted to peel strength by dividing the force (Newtons) by the sample width. The steady-state peel strength values obtained are reported in Table 1 below for both Wintec and Examples of this invention on the laminate and after injection molding to a 1.50 base lens.

The lamination equipment used for Examples 1 and 2 is a bench-top laboratory laminator from ChemInstruments. It consists of a 3 ply wet lamination where the PVOH-based resin adhesive is dispensed to each side of the middle PVOH polarizing layer film and between the outer PC layers to produce a tri-layer laminate. The roller nip speed/pressure and film tension are precisely controlled to produce a consistent spreading of the adhesive between the layers. For example 3, the laminate was produced on a similar but a larger, industrialized 3 ply wet laminator.

TABLE 1

|  | Laminate (180 deg) | 1.50 Base Lens (90 deg) |
| --- | --- | --- |
| MGC/Wintec PC/PVOH/PC laminate with polyurethane adhesive | 20 to 25 N/in | 63 N/in (1 sample) |
| Example 1 PC/PVOH/PC laminate | 12 N/in (1 sample) | 98 N/in (1 sample) |
| Example 2 PC/PVOH/PC laminate | 15 N/in (1 sample) | 32 N/in (1 sample) |
| Example 3 PC/PVOH/PC laminate | 6 N/in (1 sample) | 30 N/in (1 sample) |

Example 1

The 3-layer laminate for Example 1 of this invention used the following specific steps:

PC film: Non-stretched polycarbonate film (250 micrometers thick)

PVOH film: stretched and polarized film from Onbitt (color grey category 3, 1700 dp, 2.5% Boron)

Adhesive formulation: 5% Z320+5% Glyoxal+0.05 w/w 1N HCl/Z320+90% DI water

Aminosilane treatment steps for PC film:

1. 5.7% A1100 (aminosilane) at 60° C. for 90 s (withdraw rate=2.6 m/min)

2. DI rinse 1 at 60° C. for 30 s

3. DI rinse 2 at 60° C. for 1 minute (withdraw rate=2.6 m/min)

4. Dry at room temperature

Lamination (from Chemtura Instruments)

Gap=0.018 inches

Pressure=30 psi

Speed=2 m/min

Post-lamination cure=60° C./10 min, 20° C./1 day, 90° C./3 hrs.

Example 2

The 3-layer laminate for Example 2 of this invention used the following specific steps:
PC film=Stretched polycarbonate film (300 micrometers thick; 4400-4800 nm retardation value)
PVOH film=stretched and polarized film from Onbitt (color grey category 3, 1700 dp, 2.5% Boron)
Adhesive formulation=5% Z320+5% Glyoxal+0.05 w/w 1N HCl/Z320+90% DI water
Aminosilane treatment steps for PC film:
5.7% A1100 at 60° C. for 90 s (withdraw rate=not controlled)
DI rinse at room temperature under facet for 30 seconds
Dry at room temperature
Lamination (benchtop laboratory laminator from Chemm Instruments)
  Gap=0.018 inches
  Pressure=30 psi
  Speed=2 m/min
Post-lamination cure=60° C./10 min, 20° C./7 day, 90° C./10 min Example 3

The 3-layer laminate for Example 3 of this invention used the following specific steps:
  PC film=Stretched polycarbonate film (300 micrometers thick; 4400-4800 nm retardation value)
  PVOH film=stretched and polarized film from Onbitt (color grey category 3, 2400 dp, 1.8% Boron)
  Adhesive formulation=5% Z320+5% Glyoxal+0.05 w/w 1N HCl/Z320+90% DI water
  Aminosilane treatment steps for PC film:
  5.7% A1100 at 60° C. for 82 seconds (withdraw rate=4 m/min)
  DI rinse at 50° C. for 70 seconds
  Dry at 40° C. for 130 seconds
  Lamination
  Gap=none (touching rollers)
  Pressure=unknown
  Speed=3.3 m/min
  Post-lamination cure=90° C./5 min The claims are not to be interpreted as including means-plus- or step-plus-function limitations, unless such a limitation is explicitly recited in a given claim using the phrase(s) "means for" or "step for," respectively.

The invention claimed is:

1. A method for producing an ophthalmic lens comprising a laminate with at least one polycarbonate layer adhered to at least one polyvinyl alcohol (PVOH) layer, the method comprising:
   treating a polycarbonate (PC) film with an aminosilane primer in a concentration range of from 0.5 to 15%;
   applying a PVOH-based resin adhesive to a PVOH film;
   laminating the treated PC film to the PVOH film to produce a laminate;
   heat curing the laminate; and
   cutting the laminate into a laminate wafer;
   wherein the laminate may further comprise one or more additional layers or sublayers, each layer or sublayer being independently selected from the group consisting of PC, PVOH, polymethyl methacrylate, cellulose triacetate, cellulose acetate butyrate, cellulose acetate, cyclic olefin copolymer, norbornene-containing olefin polymer, polyurethane, polystyrene, polyethylene terephthalate, and other clear or colored film layers.

2. The method of claim 1, wherein the PVOH film comprises a boron content less than 5%.

3. The method of claim 2, wherein the PVOH film comprises a boron content less than 2%.

4. The method of claim 1, wherein the PVOH-based resin adhesive further comprises a crosslinker.

5. The method of claim 4, wherein the crosslinker is an amine, acrylate, isocyanate, melamine, aldehyde, or a metal.

6. The method of claim 1, wherein the post-curing PVOH-based resin adhesive layer thickness is less than 10 μm.

7. The method of claim 6, wherein the post-curing PVOH-based resin adhesive layer thickness is less than 5 μm.

8. The method of claim 1, wherein the heat curing further comprises passing the laminate through a multipass oven at a temperature of at least 60° C., for at least 5 minutes.

9. The method of claim 1, further comprising thermoforming the laminate wafer, the thermoforming comprising:
   maintaining the laminate wafer above a critical relative humidity,
   drying the laminate wafer to a pre-determined moisture content, and pre-heating the laminate wafer to prevent PVOH layer microcracking; and thermoforming the laminate wafer in a thermoforming device.

10. The method of claim 9, further comprising incorporating the laminate wafer into an ophthalmic lens by a lens-production method selected from the group consisting of injection molding, casting, and lamination.

11. The method of claim 1, wherein the aminosilane primer is selected from the group consisting of 3-aminopropyl-triethoxysilane, 3-aminopropyl-trimethoxysilane, 3-aminopropyldimethylethoxysilane, 3-aminopropyl-methyldiethoxysilane, 3-aminoethyl-triethoxysilane, bis(3-triethoxysilyl-propyl) amine, bis(3-trimethoxysilyl-propyl) amine, N-(n-butyl)-3-aminopropyl-trimethoxysilane, N-(n-butyl)-3-aminopropyl-methyldimethoxysilane, N-(2-aminoethyl)-3-aminopropyl-trimethoxysilane, N-(2-aminoethyl)-3-aminopropyl-methyldimethoxysilane, 2-aminoethyl-3-aminopropyl-methyldimethoxysilane, 2-aminoethyl-3-aminopropyl-trimethoxysilane, (3-trimethoxysilylpropyl) diethylenetriamine, N,N-di(2-aminoethyl)-3-aminopropyl-trimethoxysilane, N,N-di(2-aminoethyl)-3-aminopropyl-triethoxysilane, N,N-di(2-aminoethyl)-3-aminopropyl-methyldimethoxysilane, N,N-di(2-aminoethyl)-3-aminopropyl-methyldiethoxysilane, N—[N'-(2-aminoethyl)-2-aminoethyl)]-3-aminopropyl-trimethoxysilane, N-methyl-3-aminopropyl-trimethoxysilane, N-methyl-3-aminopropyl-methyldimethoxysilane, N-methyl-3-aminopropyl-triethoxysilane, N-methyl-3-aminopropyl-methyldiethoxysilane, N-cyclohexyl-3-aminopropyl-trimethoxysilane, N-cyclohexyl-3-aminopropyl-triethoxysilane, and N-phenyl-3-aminopropyl-trimethoxysilane.

12. The method of claim 1, wherein the ophthalmic lens further comprises a hard coat layer on a substrate side opposite to the laminate.

13. A method for increasing the adhesion between a PC film layer and a PVOH film layer of an optical article, comprising:
   treating the PC film with an aminosilane primer in a concentration range of from 0.5 to 15%;
   applying a layer of a PVOH-based resin adhesive to the PVOH film;
   laminating the primer-treated PC film to the PVOH film to produce a laminate;

heat curing the laminate;
thermoforming the laminate; and
subjecting the laminate to heat and pressure;
wherein the laminate may further comprise one or more additional layers or sublayers, each layer or sublayer being independently selected from the group consisting of PC, PVOH, polymethyl methacrylate, cellulose triacetate, cellulose acetate butyrate, cellulose acetate, cyclic olefin copolymer, norbornene-containing olefin polymer, polyurethane, polystyrene, and polyethylene terephthalate, and other clear or colored film layers.

14. The method of claim 13, wherein the aminosilane primer is selected from the group consisting of 3-aminopropyl-triethoxysilane, 3-aminopropyl-trimethoxysilane, 3-aminopropyl-dimethylethoxysilane, 3-aminopropyl-methyldiethoxysilane, 3-aminoethyl-triethoxysilane, bis(3-triethoxysilyl-propyl) amine, bis(3-trimethoxysilyl-propyl) amine, N-(n-butyl)-3-aminopropyl-trimethoxysilane, N-(n-butyl)-3-aminopropyl-methyldimethoxysilane, N-(2-aminoethyl)-3-aminopropyl-trimethoxysilane, N-(2-aminoethyl)-3-aminopropyl-methyldimethoxysilane, 2-aminoethyl-3-aminopropyl-methyldimethoxysilane, 2-aminoethyl-3-aminopropyl-trimethoxysilane, (3-trimethoxysilylpropyl) diethylenetriamine, N,N-di(2-aminoethyl)-3-aminopropyl-trimethoxysilane, N,N-di(2-aminoethyl)-3 aminopropyl-triethoxysilane, N,N-di(2-aminoethyl)-3-aminopropyl-methyldimethoxysilane, N,N-di(2-aminoethyl)-3 aminopropyl-methyldiethoxysilane, N—[N'-(2-aminoethyl)-2-aminoethyl)]-3-aminopropyl-trimethoxysilane, N-methyl-3-aminopropyl-trimethoxysilane, N-methyl-3-aminopropyl-methyldimethoxysilane,N-methyl-3-aminopropyl-triethoxysilane, N-methyl-3-aminopropyl-methyldiethoxysilane, N-cyclohexyl-3-aminopropyl-trimethoxysilane, N-cyclohexyl-3-aminopropyl-triethoxysilane, and N-phenyl-3-aminopropyl-trimethoxysilane.

15. The method of claim 13, wherein the PVOH film comprises a boron content lower than 5%.

16. The method of claim 15, wherein the PVOH film comprises a boron content less than 2%.

17. The method of claim 13, wherein the PVOH-based resin further comprises a crosslinker.

18. The method of claim 17, wherein the crosslinker is an amine, acrylate, isocyanate, melamine, aldehyde, or a metal.

19. The method of claim 13, wherein the post-curing PVOH-based resin adhesive layer thickness is less than 10 µm.

20. The method of claim 1, wherein during the treating, the concentration range of the aminosilane primer is between 4 and 6%.

21. The method of claim 13, wherein during the treating, the concentration range of the aminosilane primer is between 4 and 6%.

* * * * *